United States Patent [19]

Nomura et al.

[11] Patent Number: 4,897,320

[45] Date of Patent: Jan. 30, 1990

[54] MAGNETO-OPTICAL RECORDING MEDIUM

[75] Inventors: Masaaki Nomura; Takashi Yamada; Ryoichi Yamamoto; Akira Nahara, all of Odawara, Japan

[73] Assignee: Fuji Photo Film Co., Ltd., Minami-ashigari, Japan

[21] Appl. No.: 231,613

[22] Filed: Aug. 11, 1988

Related U.S. Application Data

[63] Continuation-in-part of Ser. No. 27,877, Mar. 19, 1987, abandoned.

[30] Foreign Application Priority Data

Mar. 20, 1986 [JP] Japan .................................. 61-63371

[51] Int. Cl.$^4$ .......................... G11B 5/66; G11B 11/00; G11C 13/06
[52] U.S. Cl. ................................... 428/694; 365/122; 369/13; 428/900
[58] Field of Search ........................ 428/694, 900, 698; 365/122; 369/13

[56] References Cited

U.S. PATENT DOCUMENTS

| | | | |
|---|---|---|---|
| 4,664,977 | 5/1987 | Osato et al. | 428/694 |
| 4,666,789 | 5/1987 | Gueugnon et al. | 428/900 |
| 4,675,767 | 6/1987 | Osato et al. | 360/131 |
| 4,683,176 | 7/1987 | Nakamura et al. | 428/692 |

FOREIGN PATENT DOCUMENTS

| | | |
|---|---|---|
| 135322 | 3/1985 | European Pat. Off. . |
| 185052 | 10/1984 | Japan . |
| 243842 | 12/1985 | Japan . |
| 20244 | 1/1986 | Japan . |
| 22454 | 1/1986 | Japan . |
| 22455 | 1/1986 | Japan . |
| 22456 | 1/1986 | Japan . |
| 589677 | 1/1978 | U.S.S.R. . |

*Primary Examiner*—George F. Lesmes
*Assistant Examiner*—Dennis V. Carmen
*Attorney, Agent, or Firm*—Sixbey, Friedman, Leedom & Ferguson

[57] ABSTRACT

A magneto-optical recording medium comprises a recording layer formed of a magnetic material, and a protective layer composed of a combination of a dielectric material with a rare earth metal exhibiting a high oxygen absorptivity and formed on the recording layer by a simultaneous sputtering or a simultaneous deposition process, whereby free oxygen given rise to in the course of sputtering or deposition is absorbed on the protective layer side before being absorbed on the recording layer side.

6 Claims, 1 Drawing Sheet

MAGNETO-OPTICAL RECORDING MEDIUM

This application is a continuation-in-part of Ser. No. 027,877, filed 3/19/87, now abandoned.

BACKGROUND OF THE INVENTION

1. Field of the Invention

This invention relates to a magneto-optical recording medium such as a magneto-optical disk on which erasing and rerecording are possible and which is used for a large-capacity information file or the like. This invention particularly relates to an improvement of a protective layer of the magneto-optical recording medium.

2. Description of the Prior Art

Optical recording media have various advantages. For example, they can record information at a high density, have a large capacity, and need not be contacted with a head. Among such media, the magneto-optical recording media have attracted special attention for enabling easy erasing and rerecording.

The magneto-optical recording medium is composed of a magnetic material as a recording medium, and records information based on changes in magnetization of the magnetic material. For example, an amorphous magnetic material composed of a combination of a rare earth metal (RE) such as Gd, Tb or Dy with a transition metal such as Fe, Co or Ni is used as the magnetic material. The magnetic material is used in a layer form as a recording layer. The magnetic material, particularly the rare earth metal contained therein, is readily oxidized. When the magnetic material is oxidized, magnetic characteristics such as the coercive force thereof deteriorate. Therefore, in order to isolate the recording layer from ambient air, the recording layer has heretofore been covered by a protective layer formed of a dielectric material.

The protective layer has heretofore been formed by a sputtering process or the like. However, the sputtering process has the drawback that free oxygen given rise to in the course of sputtering clings to the surface of the recording layer and penetrates through the recording layer, thereby oxidizing the magnetic material. Thus, ironically, oxidization is as a result promoted in the course of formation of the protective layer for the purpose of preventing oxidization.

SUMMARY OF THE INVENTION

The primary object of the present invention is to provide a magneto-optical recording medium which prevents the magnetic material from being oxidized by free oxygen given rise to in the course of formation of a protective layer.

Another object of the present invention is to provide a magneto-optical recording medium which prevents deterioration of magnetic characteristics.

The present invention provides a magneto-optical recording medium comprising a recording layer formed of a magnetic material, and a protective layer composed of a combination of a dielectric material with a rare earth metal exhibiting a high oxygen absorptivity and formed on the recording layer by a simultaneous sputtering or a simultaneous deposition process, whereby free oxygen given rise to in the course of sputtering or deposition is absorbed on the protective layer side before being absorbed on the recording layer side.

In general, with the simultaneous sputtering process, a thin film composed of a plurality of substances in desired composition ratios is formed by disposing a plurality of targets formed of different substances and controlling sputtering rates of the substances by changing the electric energy applied to the targets. In the present invention, the term "simultaneous sputtering process" means a sputtering process wherein sputtering (magnetron sputtering or the like) of a rare earth metal and sputtering (radio-frequency sputtering or the like) of a dielectric material are conducted simultaneously on a single substrate.

With the simultaneous deposition process, a thin film composed of a plurality of substances in desired composition ratios is formed by disposing a plurality of different deposition substances and controlling the amounts of deposited substances by changing the electric currents applied to electron guns for emitting electron beams to the deposition substances or by changing the electric currents directly applied to the deposition substances.

The aforesaid dielectric material may be, for example, SiO, $SiO_2$, $Si_3N_4$, $Al_2O_3$, AlN, or ZnS.

The aforesaid rare earth metal may be in the form of the rare earth metal alone or in the form of a compound such as an alloy with a transition metal or the like.

The desired composition ratio of rare earth metal and dielectric material in the protective layer is preferably maintained so that the content of rare earth metal in the mixture is within the range of 15–45 percent by volume. This range ensures sufficient oxygen absorptivity in accordance with the above-noted objects of the present invention.

The protective layer must be adjacent to the recording layer. The present invention embraces both the case where the protective layer is formed on a single surface of the recording layer and the case where the protective layer is formed on both surfaces of the recording layer.

With the magneto-optical recording medium in accordance with the present invention, since the protective layer is mixed with the rare earth metal for absorbing free oxygen given rise to in the course of sputtering or deposition, there is no risk of free oxygen penetrating into the recording layer, and it is possible to prevent the magnetic material from being oxidized by free oxygen. Therefore, it becomes possible to prevent coercive force and other characteristics from being deteriorated by oxidization.

Also, since the thin film composed of the rare earth metal and the dielectric material is formed by the simultaneous sputtering process or the simultaneous deposition process, the rare earth metal and the dielectric material are uniformly mixed together, and it is possible to achieve uniform oxygen absorptivity over the entire protective layer.

DESCRIPTION OF THE PREFERRED EMBODIMENTS

The present invention will hereinbelow be described in further detail with reference to the accompanying drawings.

Figure 2:
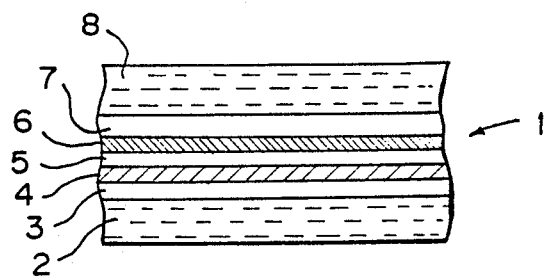
FIG. 2 is a sectional side view showing the layer configuration of the embodiment of the magneto-optical recording medium in accordance with the present invention.

Referring to FIG. 2, a magneto-optical disk 1 as an example of the magneto-optical recording medium comprises a write-side transparent nonmagnetic substrate 2, a first protective layer 3, a recording layer 4, a second protective layer 5 and a reflection layer 6, which layers are stacked on the write-side transparent nonmagnetic substrate 2 in this order, and an external transparent nonmagnetic substrate 8 secured on the reflection layer 6 by an adhesive layer 7.

The transparent nonmagnetic substrates 2 and 8 are formed of glass or a transparent plastic material such as an acrylic resin (e.g. PMMA) or polycarbonate resin and have a thickness of approximately 1 mm.

The first protective layer 3 and the second protective layer 5 are composed of a layer of a mixture of a dielectric material with a rare earth metal in the form of a rare earth metal-transition metal alloy or the like, and have a thickness within the range of approximately 500Å to approximately 3,000Å. In the case where the rare earth metal is in the form of the rare earth metal alone, Gd, Tb, Dy, Ce or the like is used. In the case where the rare earth metal is in the form of a rare earth metal-transition metal alloy, an alloy such as GdFe, TbFe, DyFe, GdTbFe, TbDyFe, TbFeCo, GdFeCo, or GdTbCo is used. SiO, SiO$_2$, Si$_3$N$_4$, ZnS or the like is used as the dielectric material.

The recording layer 4 is formed of a magnetic material such as an amorphous rare earth metal-transition metal alloy. The element of the magnetic material may be identical with or different from the elements used for the protective layers 3 and 5. The thickness of the recording layer is approximately 200Å for example.

The reflection layer 6 is formed of a metal such as aluminum, gold, silver, or titanium, or an alloy thereof, and has a thickness of, for example, 1,000Å. The reflection layer 6 reflects a laser beam toward the write-side of the magneto-optical disk 1.

The adhesive layer 7 consists of a silicone adhesive (for example, SE1700 marketed by Toray Silicone K.K.) or the like, and applied to a thickness of 10 μm.

The protective layer of the magneto-optical disk in accordance with the present invention is mixed with the rare earth metal exhibiting a high oxygen absorptivity, and free oxygen given rise to in the course of sputtering or deposition is caused to couple with the rare earth metal, whereby free oxygen is prevented from penetrating into the recording layer. The content of rare earth metal in the proective layer is preferably within the range of 15-45 volume %. If the content of rare earth metal is less than 15% volume, the oxygen absorptivity of the second protective layer 5 will be low and, accordingly, oxidation of the recording layer 4 will proceed as the storage time increases, thereby reducing reflectivity. On the other hand, if the content of rare earth metal exceeds 45% volume, the rare earth metal will overlap in the thickness direction of the second protective layer 5 which will form a passage for oxygen, or will be oxidized to thereby generate a pinhole in the protective layer, thereby facilitating deterioration of the recording layer 4. Also, light transmissivity of the first protective layer 3 will decrease because of the high percentage of rare earth metal. The step of forming the protective layer 5 in the embodiment of FIG. 2 will hereinbelow be described with reference to FIGS. 1A and 1B.

Figure 1A:
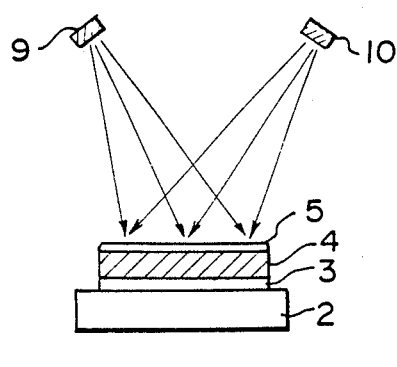
FIGS. 1A and 1B are sectional side views showing the steps of forming the protective layer of an embodiment of the magneto-optical recording medium in accordance with the present invention by the simultaneous sputtering process and the simultaneous deposition process.

FIG. 1A shows the simultaneous sputtering process. A vacuum chamber is evacuated to approximately $10^{-5}$ Torr, and argon gas is introduced thereinto to approximately $10^{-2}$ Torr. A rare earth metal-transition metal alloy target 9 and a dielectric material target 10 are disposed in the argon atmosphere, and a stack of the transparent nonmagnetic substrate 2 and the protective layer 3 and the recording layer 4 overlaid on the substrate 2 in this order is disposed below the targets 9 and 10.

A magnetron sputtering process is used for the rare earth metal-transition metal alloy target 9, and a radio-frequency sputtering process is used for the dielectric material target 10. Electric energy is simultaneously applied to the targets 9 and 10, and application of electric energy thereto is stopped when a thin layer having a predetermined thickness (for example, 1,000Å) has been formed on the recording layer 4.

The composition ratio of the protective layer 5 can be adjusted by changing the ratio of the electric energy level for the target 9 to the electric energy level for the target 10.

Figure 1B:
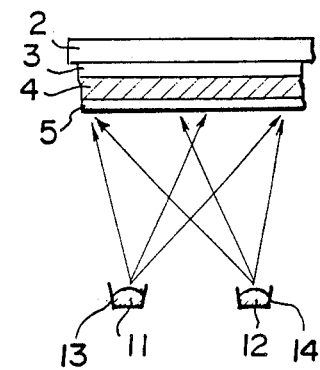

FIG. 1B shows the simultaneous deposition process. A deposition material 11 consisting of a rare earth metal-transition metal alloy and a deposition material 12 consisting of a dielectric material are disposed in a vacuum chamber evacuated to approximately $10^{-5}$ Torr, and deposition of the deposition material 11 and deposition of the deposition material 12 are conducted simultaneously on the recording layer 4. In the case of resistance heating, electric currents are applied simultaneously to deposition vessels 13 and 14 closely contacting the deposition materials 11 and 12 respectively. In the case of electron bombardment, electric currents are applied simultaneously to two electron guns corresponding to the deposition materials 11 and 12. Application of the electric currents is stopped when a thin layer having a predetermined thickness (for example, 1,000Å) has been formed on the recording layer 4.

The composition ratio of the protective layer 5 can be adjusted by changing the ratio of the electric current levels applied to the deposition vessels 13 and 14 or to the electron guns.

The protective layer 3 may be formed in the same manner as the protective layer 5. However, in the magneto-optical recording medium of the present invention, the protective layer 3 may be omitted.

The magneto-optical recording medium in accordance with the present invention is applicable to both a disk with grooves and a disk without grooves.

What is claimed is:

1. A magneto-optical recording medium comprising a transparent nonmagnetic substrate, a magneto-optical recording layer overlaid on said transparent nonmagnetic substrate, and a protective layer overlaid on said magneto-optical recording layer, wherein said protective layer is composed of a layer of a mixture of a rare earth metal with a dielectric material, the content of the rare earth metal in the mixture of the protective layer being within the range of 15-45 percent by volume;
   whereby free oxygen given rise to in the course of sputtering or deposition of said protective layer is absorbed on the protective layer said before it can be absorbed on the recording layer.

2. A magneto-optical recording medium as defined in claim 1 wherein said protective layer is formed by a simultaneous sputtering process or a simultaneous deposition process.

3. A magneto-optical recording medium as defined in claim 1 wherein said rare earth metal is in the form of an alloy with a transition metal.

4. A magneto-optical recording medium comprising a transparent nonmagnetic substrate,
a first protective layer overlaid on said transparent nonmagnetic substrate, a magneto-optical recording layer disposed on said first protective layer, and a second protective layer disposed on said magneto-optical recording layer, wherein said first and second protective layers are composed of a layer of a mixture of a rare earth metal with a dielectric material whereby free oxygen, given rise to during sputtering or deposition of said first and second protective layers, is absorbed on said protective layers before it can be absorbed on the recording layer.

5. A magneto-optical recording medium as defined in claim 4 wherein said rare earth metal and dielectric material of said first and second layers are deposited by a simultaneous sputtering process or a simultaneous deposition process.

6. A magneto-optical recording medium as defined in claim 4 wherein said rare earth metal is in the form of an alloy with a transition metal.

* * * * *